(12) United States Patent
Wurst et al.

(10) Patent No.: US 11,681,101 B2
(45) Date of Patent: Jun. 20, 2023

(54) REWORKABLE SPLICE MODULE

(71) Applicant: CommScope Technologies LLC, Hickory, NC (US)

(72) Inventors: David R. Wurst, Minneapolis, MN (US); Jacob C. Anderson, Chanhassen, MN (US); Paul M. Lawson, Minneapolis, MN (US)

(73) Assignee: Commscope Technologies, LLC, Hickory, NC (US)

( * ) Notice: Subject to any disclaimer, the term of this patent is extended or adjusted under 35 U.S.C. 154(b) by 23 days.

(21) Appl. No.: 17/070,490

(22) Filed: Oct. 14, 2020

(65) Prior Publication Data

US 2021/0116642 A1 Apr. 22, 2021

Related U.S. Application Data

(60) Provisional application No. 62/916,475, filed on Oct. 17, 2019.

(51) Int. Cl.
| | | |
|---|---|---|
| *G02B 6/255* | (2006.01) | |
| *G02B 6/35* | (2006.01) | |
| *G02B 6/38* | (2006.01) | |

(52) U.S. Cl.
CPC ......... *G02B 6/2558* (2013.01); *G02B 6/3564* (2013.01); *G02B 6/3801* (2013.01)

(58) Field of Classification Search
CPC ............. G02B 6/255; G02B 6/35; G02B 6/38
See application file for complete search history.

(56) References Cited

U.S. PATENT DOCUMENTS

| | | | | |
|---|---|---|---|---|
| 5,963,699 A * | 10/1999 | Tanaka | ................. | G02B 6/3806 |
| | | | | 385/83 |
| 9,500,830 B2 | 11/2016 | Lu et al. | | |
| 10,254,500 B2 | 4/2019 | Lu et al. | | |
| 10,761,287 B2 | 9/2020 | Lu et al. | | |
| 2001/0019645 A1* | 9/2001 | Edwards | .............. | G02B 6/3802 |
| | | | | 385/56 |
| 2002/0021876 A1* | 2/2002 | Liberty | ................ | G02B 6/2937 |
| | | | | 385/99 |
| 2018/0217333 A1* | 8/2018 | Watté | ................... | G02B 6/3885 |
| 2019/0137711 A1 | 5/2019 | Burek et al. | | |

FOREIGN PATENT DOCUMENTS

| | | |
|---|---|---|
| JP | 2002-162530 A | 6/2002 |
| JP | 2003-66265 A | 3/2003 |
| JP | 2004-145196 A | 5/2004 |
| JP | 2006-163258 A | 6/2006 |

OTHER PUBLICATIONS

Extended European Search Report for Application No. 20202312.3 dated Jun. 23, 2021.
Partial European Search Report for Application No. 20202312.3 dated Mar. 23, 2021.

\* cited by examiner

*Primary Examiner* — Ryan A Lepisto
*Assistant Examiner* — Erin D Chiem
(74) *Attorney, Agent, or Firm* — Merchant & Gould, P.C.

(57) ABSTRACT

A splice module includes a main splicing channel and a rework channel. The main splicing channel has an encapsulated section at which one or more initial splices can be stored. The main splicing channel also includes a non-encapsulated section through which trunk cable fibers of the initial splices extend. If re-splicing is needed, the trunk cable fibers can be accessed at the non-encapsulated section, cut, and re-spliced to a new connectorized pigtail or other optical fibers.

16 Claims, 14 Drawing Sheets

REWORKABLE SPLICE MODULE

CROSS REFERENCE TO RELATED APPLICATION

This applications claims the benefit of U.S. Provisional Application No. 62/916,475, filed Oct. 17, 2019, and titled "Reworkable Splice Module," the disclosure of which is hereby incorporated herein by reference.

BACKGROUND

In fiber optic networks, there is a push to increase density by using higher fiber count cables in data centers and elsewhere. Cables having hundreds or even thousands of optical fibers each are being routed to equipment racks for connection.

Ends of these cables are terminated at multiple multi-fiber connectors (e.g., MPO plug connectors). During termination, a cable jacket is removed to expose the optical fibers. Each optical fiber or small groups of fibers (e.g., fiber ribbons) may be manually threaded through furcation tubes. Then, the ends of the threaded fibers are connectorized, polished, and tested. Such a process is tedious, time-consuming, and labor intensive. Improvements are desired.

SUMMARY

The disclosure is directed to a splice module in which multiple optical splices between trunk cable fibers and connectorized fiber pigtails are stored. The splice module is configured to allow a technician multiple chances to optically splice one or more of the trunk cable fibers to respective pigtail fibers. For example, the splice module provides a first series of splice attempts by housing the optical splices in a channel several times the length of each optical splice. In certain implementations, the splice module also provides a second series of splice attempts even after the original optical splices are encapsulated or otherwise sealed therein.

In accordance with some aspects of the disclosure, the splice module includes a main channel and a rework channel. One or more optical splices are initially stored within the main channel. The trunk cable fibers and pigtail fibers corresponding with the one or more optical splices are routed through the main channel of the splice module. The optical splices are tested (e.g., at connectorized ends of the pigtails) and, if no rework needs to be done, the optical splices are sealed within the main channel. For example, the optical splices can be sealed within a first section of the main channel.

If rework is needed (e.g., if testing indicates that the optical splice is unsatisfactory), then the spliced section can be severed and the trunk cable fiber can be re-spliced to the same or a new connectorized pigtail. This test and re-splice process can be repeated several times (e.g., one to five times) as needed. Removing the old splice shortens either the trunk cable fiber or the connectorized pigtail. Accordingly, the splice location between the trunk cable fiber and the connectorized pigtail shifts as rework is performed. The main channel of the splice module is sufficiently long to accommodate this shifting of the splice location. For example, the main channel may be sufficiently long to accommodate about the optical splice after at least two rework attempts. In examples, the main channel may be sufficiently long to accommodate about the optical splice after at least three rework attempts. In examples, the main channel may be sufficiently long to accommodate about the optical splice after at least five rework attempts.

The optical splices are retested. If rework is still unneeded, then the rework channel can be covered and, optionally, sealed. If rework is needed, however, then select ones of the trunk cable fibers can be accessed and severed at a second, unsealed section of the main channel. The severed trunk cable fibers can be re-spliced to new pigtails. The new splices can be stored and sealed in the rework channel.

In certain implementations, the splice module includes multiple main channels that share a common rework channel. Any trunk cable fibers from either of the main channels that need rework can be re-spliced and stored in the rework channel. In an example, the splice module includes a rework channel disposed between two main channels. In other examples, however, the splice module may include additional main channels and/or addition rework channels.

One or more splice modules can be secured to a piece of equipment (e.g., a blade, a tray, etc.). For example, a locking cover can be mounted over the one or more splice modules. The locking cover may be releasably or non-releasably locked to the equipment. The locking cover may retain the one or more splice modules at the equipment. In certain examples, the splice modules fit together (e.g., in a stack) to aid in alignment and/or to inhibit relative movement therebetween.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to a splice module in which multiple optical splices between trunk cable fibers and connectorized fiber pigtails are stored. The splice module is configured to allow a technician a first series of chances and then a second series of chances to optically splice one or more of the trunk cable fibers to respective connectorized fiber pigtails. Each series of chances is provided by housing the optical splices in sufficiently large compartments to accommodate re-splicing one or more times. In certain implementations, the splice module provides this second series of chances even after the original optical splices are encapsulated therein.

In some examples, each optical splice is a mass fusion splice between a plurality of trunk cable fibers and a respective multi-fiber pigtail. For example, each mass fusion splice may optically couple a loose ribbon of the trunk cable fibers and the multi-fiber pigtail. As the term is used herein, a "loose ribbon" refers to a set of fibers that are loosely coupled together at various intervals along their length. Examples of loose ribbons are disclosed in U.S. Publication Nos. 2014/0112631, 2017/0235068, and 2017/0031121, the disclosures of which are hereby incorporated herein by reference. Other examples of loose ribbons of fibers include the Rollable Ribbons™ produced by OFS Furukawa of Norcross, Ga., the Spiderweb® Ribbon produced by AFL Telecommunications, LLC of Duncan, S.C., and the RocketRibbon® produced by Corning Optical Communications LLC of Hickory, N.C. In other examples, each optical splice is a fusion splice between a single trunk cable fiber and a respective single fiber pigtail. In still other examples, each optical splice may be a mechanical splice or other type of optical splice.

In certain implementations, a separate splice protector is disposed about each of the optical splices stored within the splice module. In some implementations, each splice protector includes a laminate configuration including outer films secured to the optical splice by adhesive. In some examples, the outer films of a splice protector are secured to the optical splice using thermoset adhesive. In other examples, the outer films are secured to the optical splice using a pressure-sensitive adhesive. Example splice protectors suitable for use in the splice module 100 are described in copending PCT Appl. No. PCT/US19/52154, filed Sep. 20, 2019, titled "Laminate Splice Protector,", the disclosure of which is hereby incorporated herein by reference in its entirety.

Figure 1:
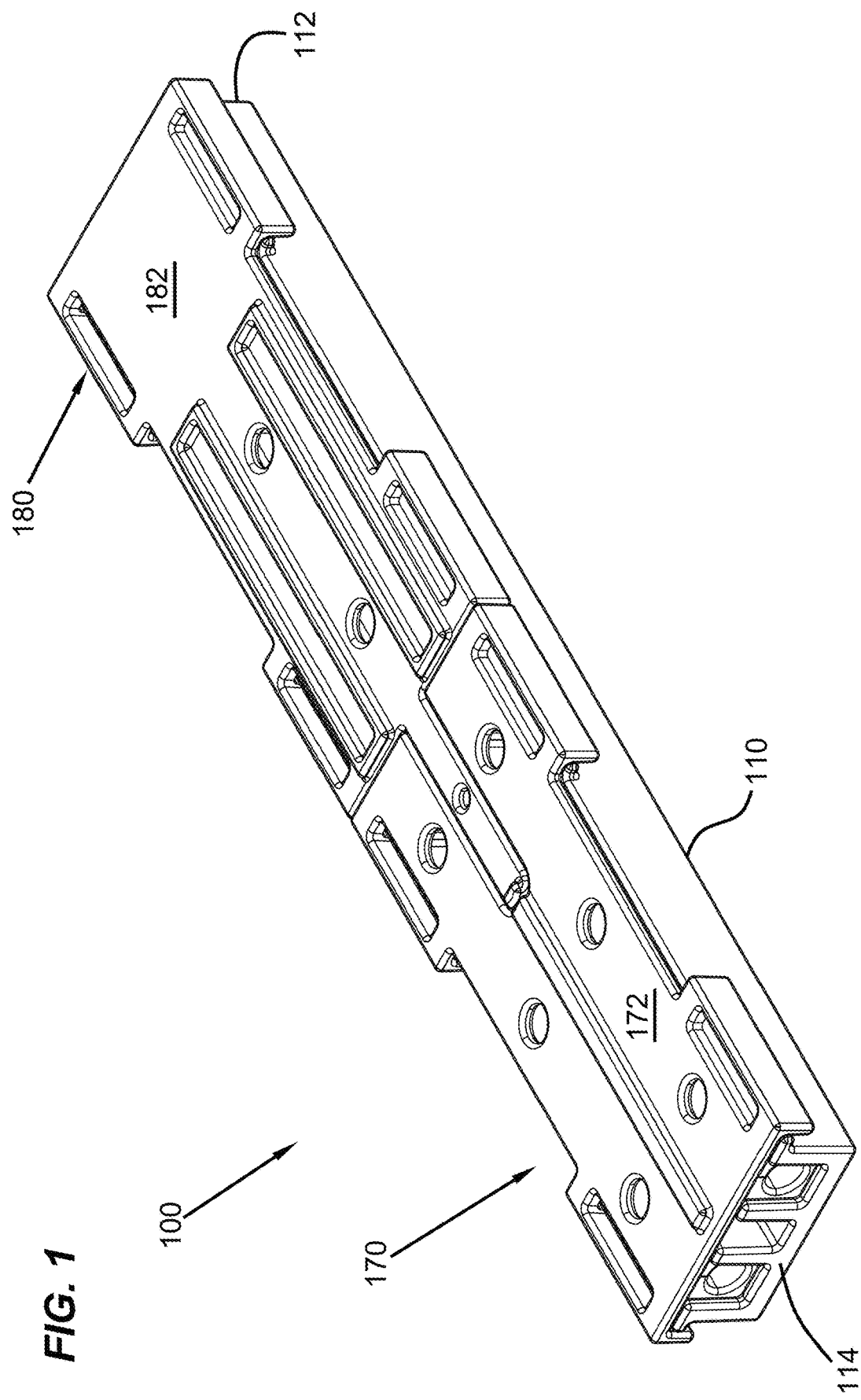
FIG. 1 is a top perspective view of an example splice module configured and assembled in accordance with the principles of the present disclosure.
Figure 2:
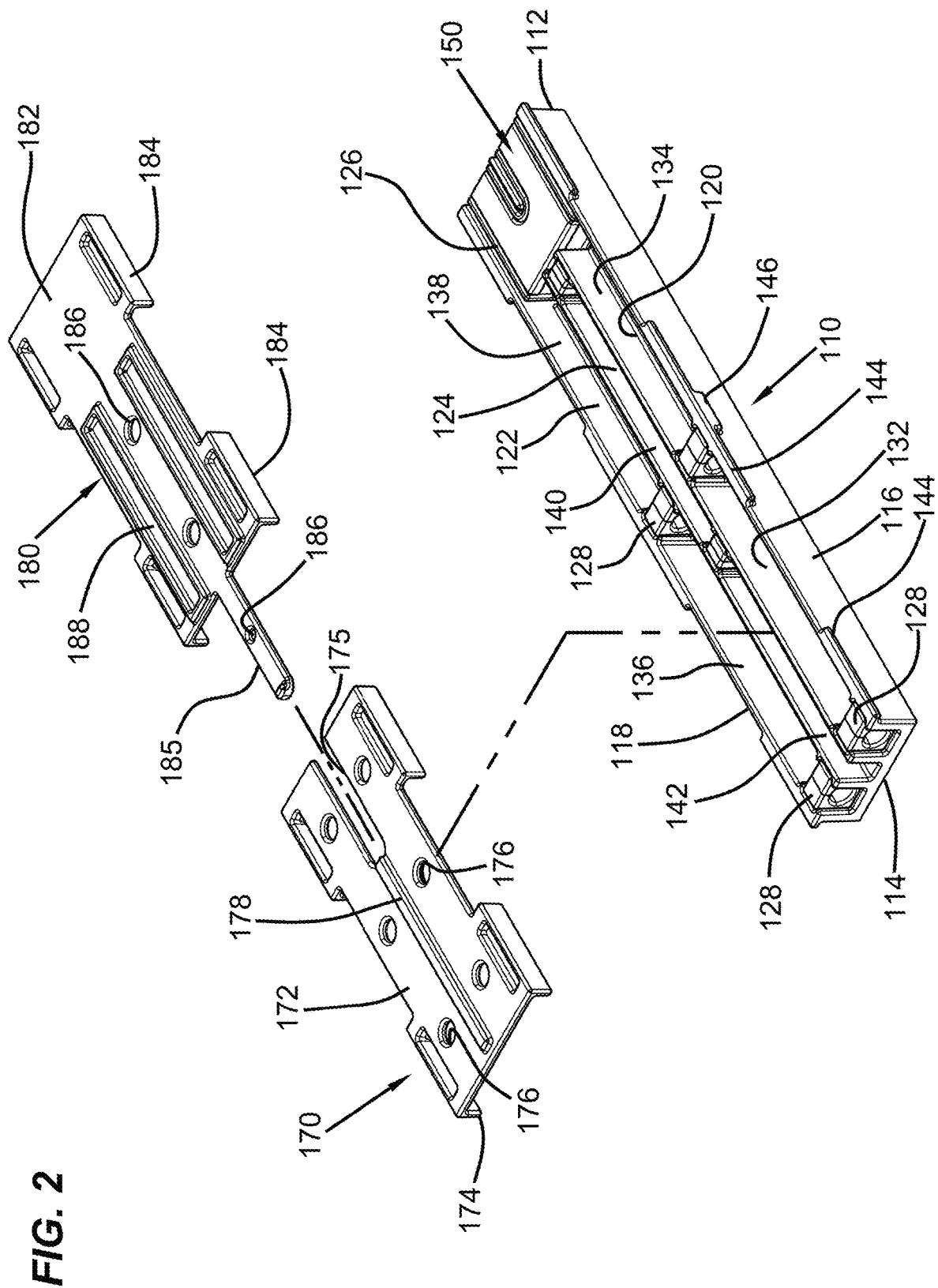
FIG. 2 is an exploded view of the splice module of FIG. 1 including a tray, a first lid, and a second lid.
Figure 3:
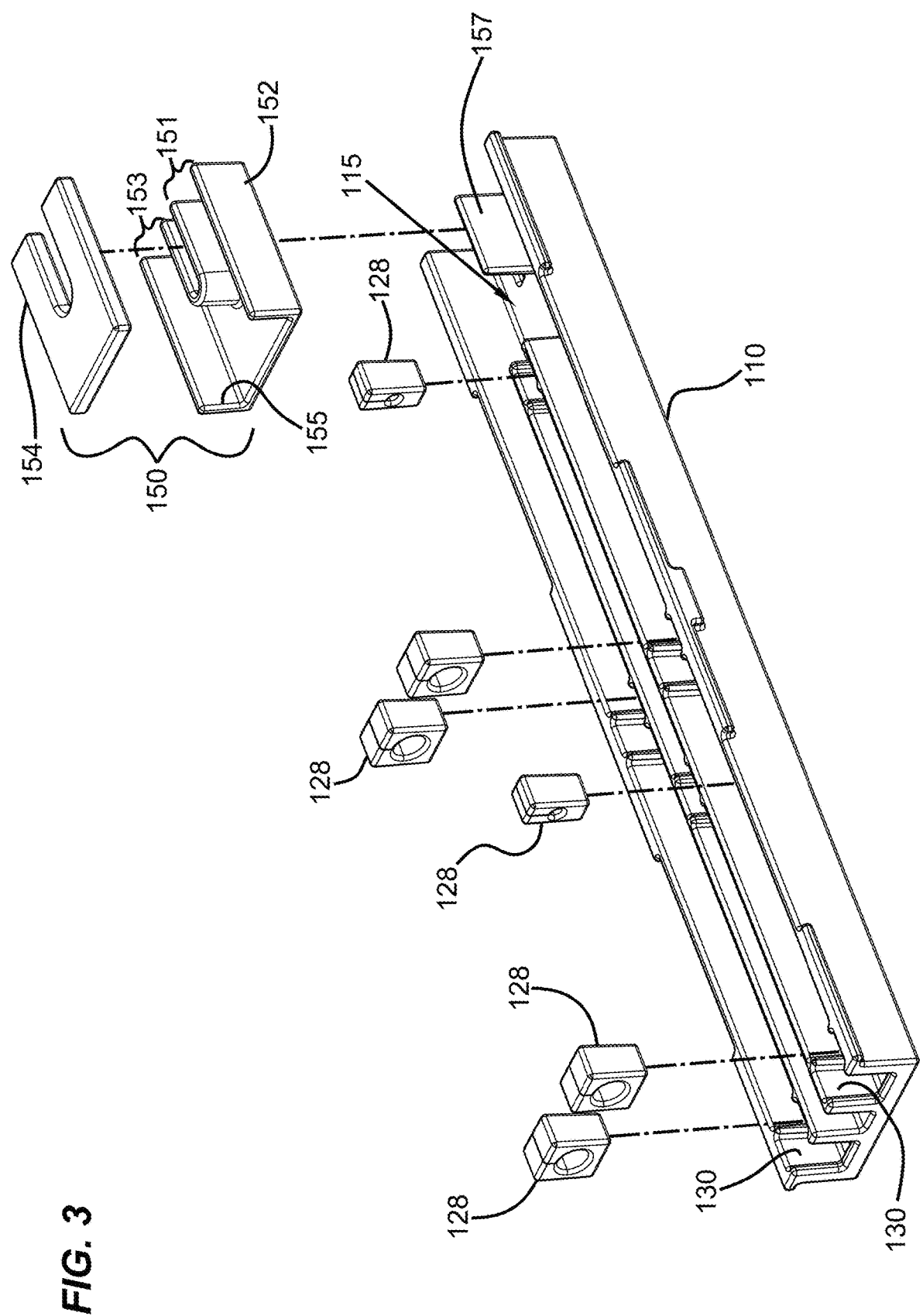
FIG. 3 is a top perspective view showing gaskets and a retention insert exploded outwardly from the tray of FIG. 2.

Referring to FIGS. 1 and 2, an example splice module 100 includes a tray 110, a first lid 170, and a second lid 180. The tray 110 extends along a length L (FIG. 5) between opposite first and second ends 112, 114. The tray 110 also extends along a width W (FIG. 5) between opposite first and second sides 116, 118. The first end 112 of the tray 110 is configured to receive the trunk cable fibers $f_T$. The second end 114 of the tray 110 is configured to receive the pigtail fibers $f_P$. The tray 110 is elongate along the length L of the tray 110. The tray 110 includes sidewalls at the first and second sides 116, 118 extending upwardly from a bottom surface to define an interior accessible through an open top. The first and second ends 112, 114 of the tray 110 also are open to the interior.

The interior of the tray 110 defines a main channel 120 and a rework channel 124 that each extend in an orientation parallel to the length L of the tray 110. Each of the channels 120, 124 is accessible at the open first and second ends 112, 114 of the tray 110. Each of the channels 120, 124 defines a respective splice portion 132, 140. The main channel 120 also defines an access portion 134 located between the splice portion 132 and the first end 112 of the tray 110. The splice portion 140 of the rework channel 124 is located closer to the first end 112 of the tray 110 than the splice portion 132 of the main channel 120.

The first lid 170 mounts to the tray 110 to extend over a portion of the open top of the tray 110. The first lid 170 covers at least the splice portion 132 of the main channel 120. The first lid 170 defines one or more injection and/or ventilation holes 176. The second lid 180 mounts to the tray 110 to cover the splice portion 140 of the rework channel 124. In certain examples, the second lid 180 also covers the access portion 134 of the main channel 120. The second lid 180 defines one or more injection and/or ventilation holes 186.

As shown in FIG. 2, the splice portion 132, 140 of each channel 120, 124 is bounded at opposite ends by grommets 128. In certain implementations, the grommets 128 are removable from the tray 110. For example, each grommet 128 may fit (e.g., friction-fit) within slots 130 defined in the channels 120, 124 of the tray 110. In certain implementations, each grommet 128 defines a slit extending between an exterior of the grommet 128 and a passageway extending through the grommet 128. The slit enables lateral mounting of the grommet 128 over one or more fibers (e.g., one or more trunk cable fibers $f_T$ or one or more pigtail fibers $f_P$).

Figure 4:
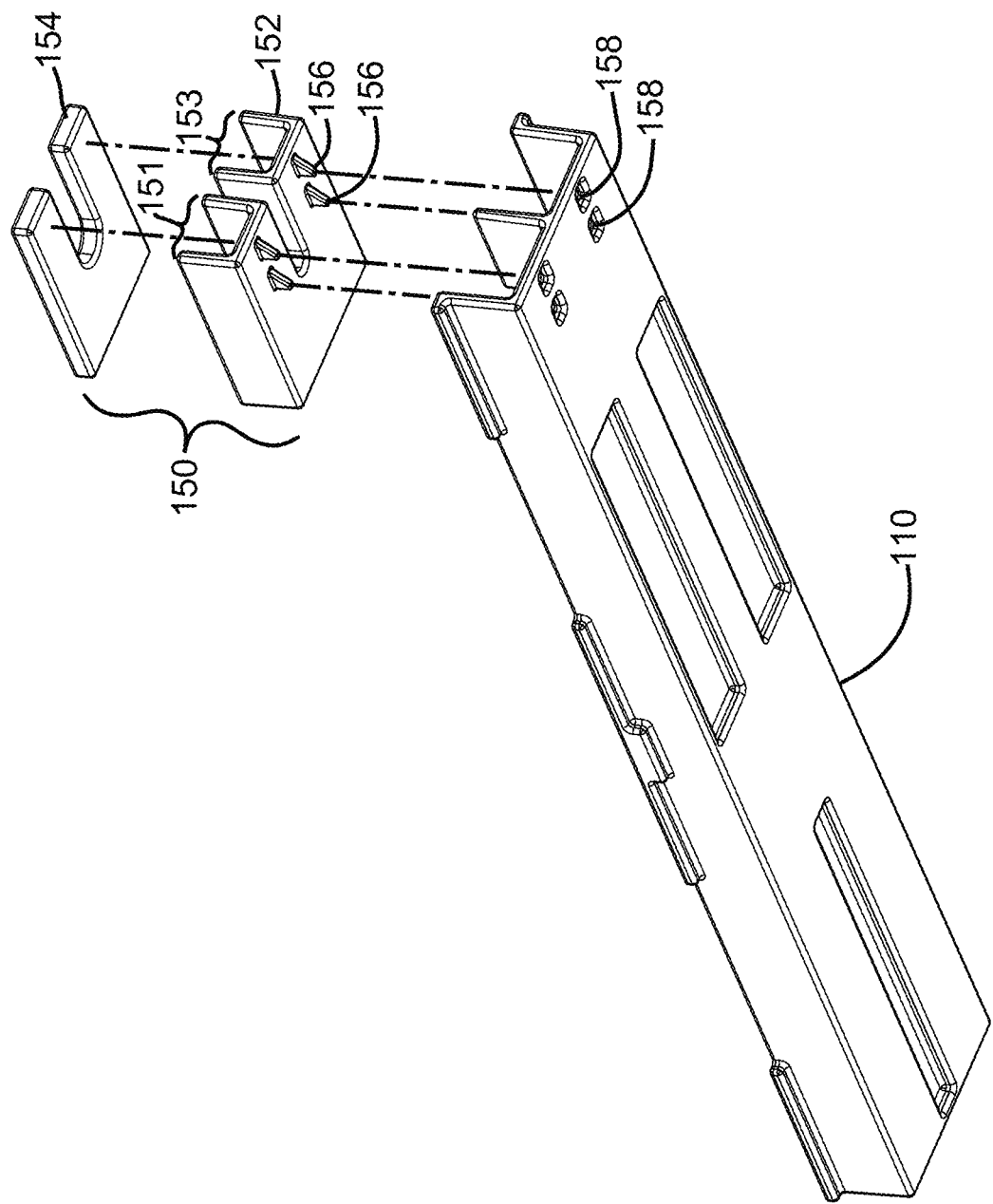
FIG. 4 is a bottom perspective view showing the retention insert exploded away from the tray of FIG. 2.

As shown in FIG. 4, a trunk retention arrangement is disposed at the first end 112 of the tray 110 to axially retain the one or more trunk cable fibers received at the splice module 100. The trunk retention arrangement includes a plurality of teeth 156 and a plurality of holes 158. A portion of the trunk cable or a sheath surrounding the trunk cable fibers is sandwiched between the teeth 156 and the holes 158.

In some implementations, the teeth 156 are disposed on a retention insert 150 that mounts within the tray 110 and the holes 158 are defined by the tray 110. In certain implementations, the retention insert 150 is captured within the tray 110 to inhibit movement of the retention insert 150 relative to the tray 110 along the length L and/or the width W of the tray 110. For example, the retention insert 150 may abut a divider between the main channel 120 and the rework channel 124.

The retention insert 150 defines a passageway having at least one first end 151, 153 aligning with the first end 112 of the tray 110 and an opposite second end 155 aligning with the channels 120, 124 of the tray 110. In certain examples, the retention insert 150 includes a first housing piece 152 and a second housing piece 154 that cooperate to define the passageway. In other implementations, the teeth 156 are disposed on the tray 110 and the holes 158 are disposed on the second lid 180.

The tray 110 defines a pocket or location 115 at which the retention insert 150 mounts. The main channel 120 and the rework channel 124 extend from the second end 114 of the tray 110 to pocket 115. Accordingly, the second end 155 of the retention insert leads to the main channel 120 and the rework channel 124. In certain implementations, the splice portion 140 of the rework channel 124 (or the gasket 128 bounding the splice portion 140) abuts the trunk retention insert 150.

Figure 5:
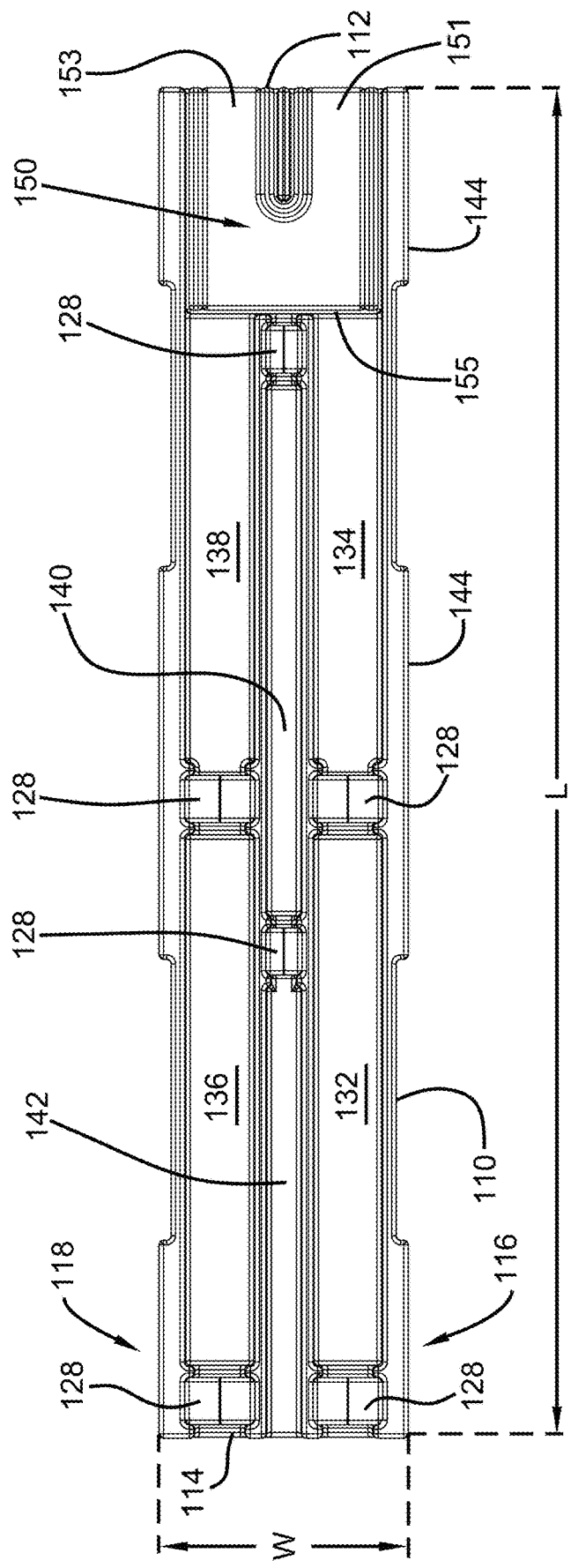
FIG. 5 is a top plan view of the tray of FIG. 2 with the first and second lids removed for ease in viewing the channels.

FIGS. 5-8 illustrate an example splicing process including a rework process. FIG. 5 illustrates the main channel 120 and the rework channel 124 extending between the retention insert 150 and the second end 114 of the tray 110. The optical splices S between the trunk cable fibers or groups of fibers $f_T$ and the respective connectorized pigtails P are formed prior to installing the trunk cable T and pigtail P at the splice module 100.

Figure 6:
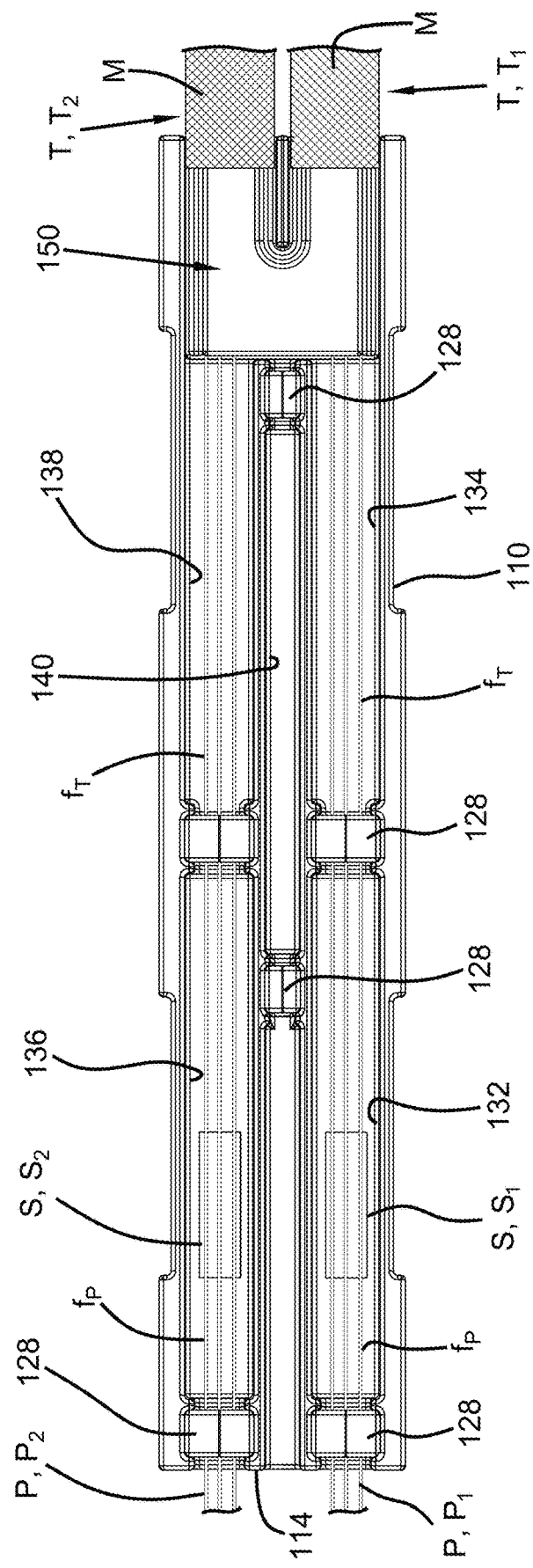
FIG. 6 shows an original cabling of the tray of FIG. 5 including optical splices disposed within both main channels.

As shown in FIG. 6, a trunk cable T is routed to the first end 112 of the tray 110. The trunk cable T includes a plurality of trunk cable fibers $f_T$ surrounded by a sheath M (e.g., a mesh sleeve). For ease in viewing, three trunk cable fibers $f_T$ are shown. However, it will be understood that each of the illustrated trunk cable fibers $f_T$ can represent a separate group of trunk cable fibers (e.g., a loose ribbon of trunk cable fibers). It will be further understood that the trunk cable T can include a greater or lesser number of trunk cable fibers $f_T$ or groups of trunk cable fibers.

The trunk cable T is secured to the splice module 100 using the trunk retention arrangement. For example, the trunk cable fibers $f_T$ may be routed through the passageway of the retention insert 150. In an example, the retention insert 150 is opened by separating the first and second housing pieces 152, 154 and the trunk cable fibers $f_T$ are routed along the first housing piece 152. The second housing piece 154 is coupled to the first housing piece 152 and the sheath M of the trunk cable T is routed over the first end 151, 153 of the retention insert 150. Accordingly, the sheath M extends over the teeth 156 of the retention insert 150. The retention insert 150 is then inserted into the tray 110, aligning the teeth 156 of the retention insert 150 with the holes 158 of the tray 158, thereby capturing the sheath M therebetween. The cooperation between the teeth 156 and the holes 158 inhibit movement of the sheath M relative to the tray 110.

As further shown in FIG. 6, the optical splice S is disposed within the splice portion 132 of the main channel 120 of the tray 110. The respective trunk cable fiber(s) $f_T$ are routed along the main channel 120 from the first end 112 of the tray 110, through the access portion 134 of the main channel 120, and into the splice portion 132 of the main channel 120. The respective pigtail fibers $f_P$ is routed along the main channel 120 from the second end 114 of the tray 110 into the splice portion 132 of the main channel 120. In certain implementations, the optical splice S is sized so that multiple optical splices S can fit within the splice portion 132 of the main channel 120. Accordingly, multiple pigtails P and multiple groups of trunk cable fibers $f_T$ can be routed through the main channel 120. Initially, the rework channel 140 is empty.

The optical splices S are tested before being encapsulated within the splice module 100. For example, test signals can be sent over the trunk cable fibers $f_T$ and monitored at the connectorized ends of the respective pigtails P. If any optical splices S are unsuitable (e.g., if the test signals received at the pigtails P are too weak or corrupted), then the trunk cable fiber(s) $f_T$ can be cut and spliced to fiber(s) $f_P$ of a new pigtail. In some implementations, the splice portion 132 of the main channel 120 is sufficiently long to enable the new optical splice to the new pigtail to still be disposed within the splice portion 132. In other implementations, the new optical splice can be disposed in the splice portion 140 of the rework channel 124 as will be described in more detail with respect to FIG. 8.

Figure 7:
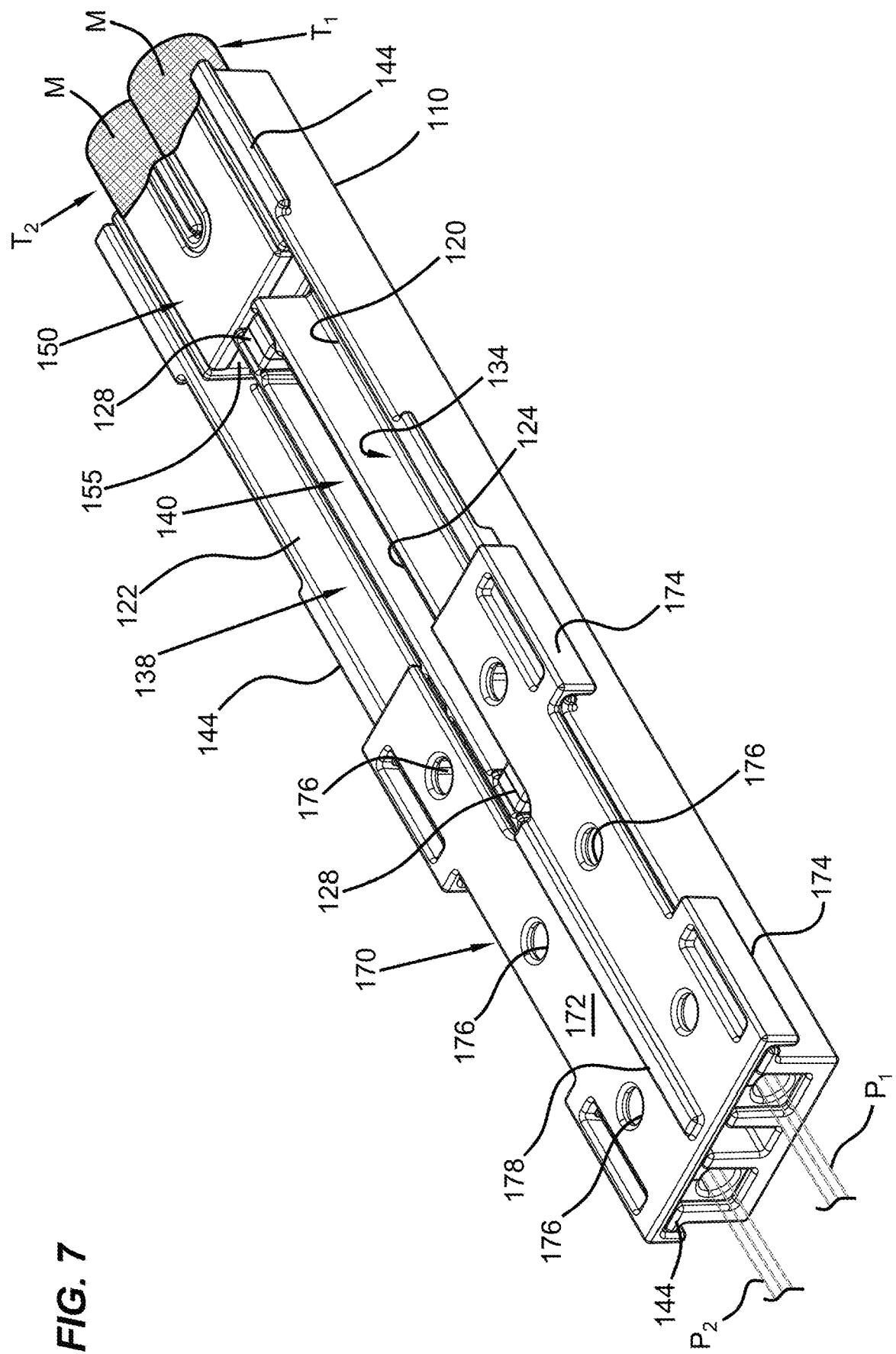
FIG. 7 is a top perspective view of the splice enclosure of FIG. 6 with the first lid mounted to the tray.
Figure 8:
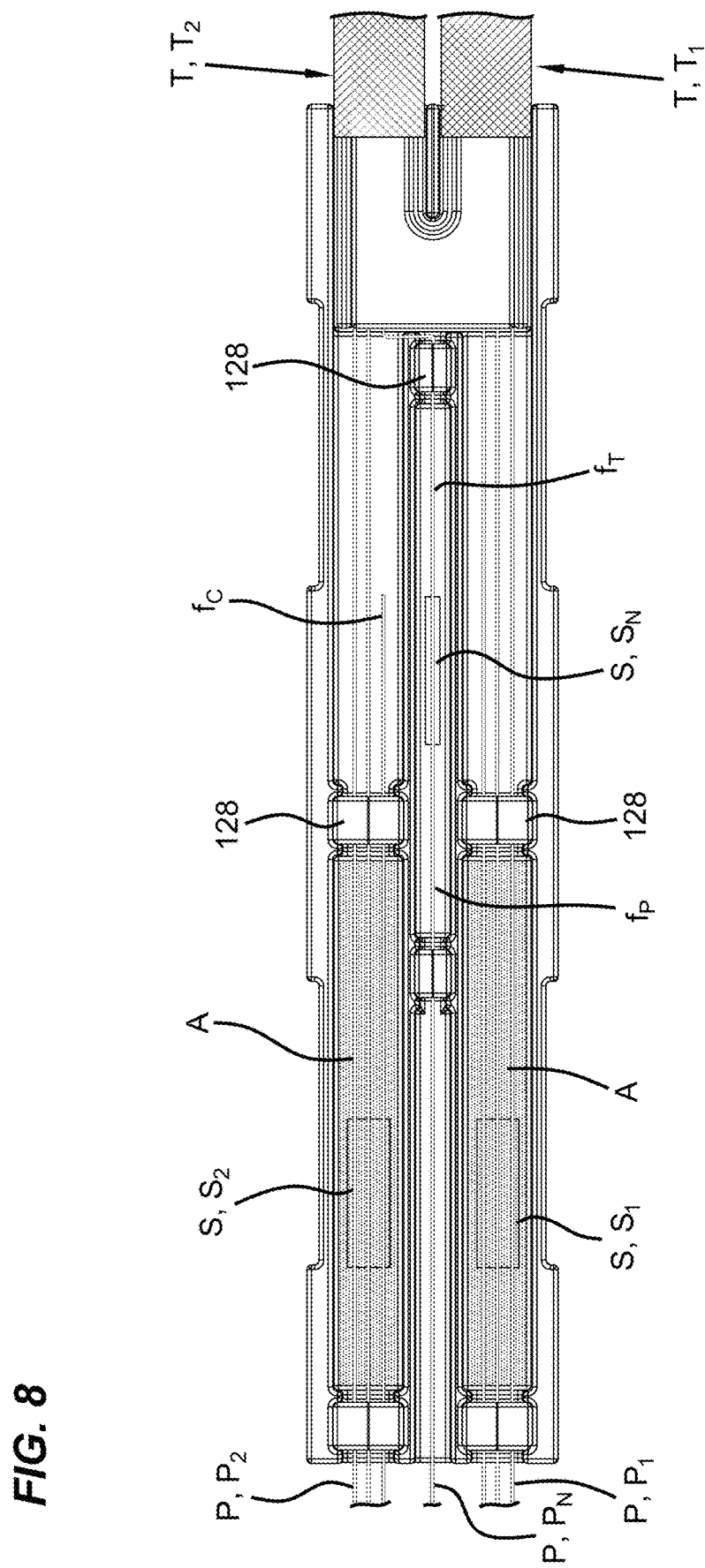
FIG. 8 is a top plan view of the tray of FIG. 6 with a new splice disposed in the rework channel; the first lid has been removed for ease in viewing the channels.

As shown in FIG. 7, the optical splice(s) S are enclosed within the splice portion 132 of the main channel 120. The first lid 170 is mounted to the tray 110 to cover the splice portion 132 of the main channel 120. For example, the first lid 170 includes a top 172 that spans the splice portion 132 of the main channel 120. In certain examples, the top 172 of the first lid 170 also spans the gaskets 128 bounding the splice portion 132. The top 172 of the first lid 170 does not extend over the access portion 134 of the main channel 120.

In certain implementations, the first lid 170 is slidable relative to the tray 110 to mount the first lid 170 to the tray 110. In some implementations, the tray 110 includes guides 144 and the first lid 170 includes guide channels 174 into which the guides 144 of the tray 110 slidingly fit. In some examples, the tray 110 includes an elongate guide spanning the length L of the tray 110 at each side thereof. In other examples, the tray 110 includes multiple guides 144 at each side. In the example shown, the first lid 170 also includes multiple guide channels 174 at each side so that the first lid 170 can be mounted to the tray 110 without needing to slide the tray 110 fully along the length of the first lid 170. Rather, the first lid 170 can be aligned with the tray 110 so that an end of each guide channel 174 aligns with an end of a respective one of the guides 144. Accordingly, the first lid 170 is only to be slid along the length of the guide 144.

In certain examples, the top 172 of the first lid 170 defines openings (e.g., injection ports) 176 through which adhesive A (e.g., epoxy) can be injected into the splice portion 132 to encapsulate the optical splices S disposed therein. Other openings 176 through the top 172 of the first lid 170 may act as ventilation holes to promote airflow during the dispersion of adhesive A. When set, the adhesive A surrounds the optical splices S to inhibit relative movement between the optical splices S (e.g., see FIG. 8). In certain examples, the set adhesive A inhibits relative movement between the splices S and the tray 110. In certain implementations, the set adhesive A bonds to both the tray 110 and the first lid 170 to non-removably secure the first lid 170 to the tray 110.

The encapsulation process may interfere with the optical coupling between the trunk cable fibers $f_T$ and the connectorized pigtails. For example, for each optical splice S, the injection of the adhesive may cause unsuitable bending in the trunk cable fibers $f_T$ or the pigtail fibers $f_P$ or may even damage the optical splice S itself. In addition, the pre-encapsulation tests of the pigtails P may have been inaccurate, leading the technician to believe the splice S performed better than it does. Accordingly, the optical splices S are retested after being encapsulated within the splice portion 132 of the main channel 120. For example, test signals can be sent over the trunk cable fibers $f_T$ and monitored at the connectorized ends of the respective pigtails P. If any optical splices S are found unsuitable (e.g., if the test signals received at the pigtails P are too weak or corrupted), then the corresponding trunk cable fibers $f_T$ can be cut and spliced to fibers $f_P$ of a new pigtail $P_N$.

Since the portions of the trunk cable fibers $f_T$ within the splice portion 132 are no longer accessible (e.g., because of the first lid 170 and/or because of the set adhesive), the trunk cable fiber(s) $f_T$ to be re-spliced are instead severed at the access portion 134 of the main channel 120. In certain examples, pigtail fiber(s) $f_P$ of a new connectorized pigtail $P_N$ are threaded through the rework channel 124 from the second end 114 of the tray 110. In certain implementations, the sheath M of the corresponding trunk cable T may be removed from the retention insert 150 to provide more maneuverability for the trunk cable fiber(s) $f_T$. In certain examples, the sheath M may be removed or partially removed from the trunk cable fiber(s) $f_T$ to provide additional maneuverability to enable the trunk cable fibers $f_T$ and the pigtail fibers $f_P$ to reach the splicing machine. In certain examples, the retention insert 150 can be removed from the tray 110.

The severed trunk cable fiber(s) $f_T$ are then re-spliced to the pigtail fibers $f_P$ of a new connectorized pigtail $P_N$ at a new optical splice $S_N$. The new optical splice $S_N$ is disposed within the splice portion 140 of the rework channel 124. For example, the new pigtail $P_N$ can be pulled through the rework channel 124 at the second end 114 of the tray 110 prior to the splicing procedure. After splicing, the new optical splice $S_N$ can be positioned within the splice portion 140 of the rework channel 124. In certain implementations, the splice portion 140 of the rework channel 124 is located closer to the first end 112 of the tray 110 than the splice portion 132 of the main channel 120. Accordingly, the severed trunk cable fiber $f_T$ can reach the splice portion 140 of the rework channel 124. The re-spliced trunk cable fiber $f_T$ is positioned within the rework channel 124 between the new optical splice $S_N$ and the first end 112 of the tray 110. In certain examples, the trunk cable sheath M is repositioned at the first end 151, 153 of the retention insert 150 and the retention insert 150 is disposed back in the pocket 115 of the tray 110.

After additional testing, the new optical splice(s) $S_N$ are enclosed within the splice portion 140 of the rework channel 124. The second lid 180 is mounted to the tray 110 to cover the splice portion 140 of the rework channel 124. For example, the second lid 180 includes a top 182 that spans the splice portion 140 of the rework channel 124. In certain examples, the top 182 of the second lid 180 also spans the gaskets 128 bounding the splice portion 140.

In certain implementations, the splice portion 140 of the rework channel 124 is longer than the access portion 134 of the main channel 120. Accordingly, in certain implementations, the top 182 of the second lid 180 laterally overlaps the top 172 of the first lid 170. For example, the top 182 of the second lid 180 may include an extension 185 that extends into a notch 175 defined in the first lid 170 to fully cover the splice portion 140 of the rework channel 124.

In certain implementations, the second lid 180 is slidable relative to the tray 110 to mount the second lid 180 to the tray 110. In some implementations, the tray 110 includes guides 144 and the second lid 180 includes guide channels 184 into which the guides 144 of the tray 110 slidingly fit. In certain examples, the guide channels 184 of the second lid 180 are the same as the guide channels 174 of the first lid 170.

In certain examples, the top 182 of the second lid 180 defines openings (e.g., injection ports) 186 through which adhesive (e.g., epoxy) can be injected into the splice portion 140 to encapsulate the reworked optical splices $S_N$ disposed therein. Other openings 186 through the top 182 of the second lid 180 may act as ventilation holes to promote airflow during the dispersion of adhesive. When set, the adhesive surrounds the one or more reworked optical splices $S_N$ to inhibit relative movement between the reworked optical splices $S_N$ and the tray 110. In certain examples, the set adhesive inhibits relative movement between the separate reworked splices $S_N$. In certain implementations, the set adhesive bonds to both the tray 110 and the second lid 180 to non-removably secure the second lid 180 to the tray 110.

In certain implementations, the splice module 100 includes a plurality of main channels. In the example shown, the splice module 100 includes two main channels 120, 122. The rework channel 124 is disposed between the two main channels 120, 122. Both of the main channels have a splice portion 132, 136 and an access portion 134, 138. The access portions 134, 138 are disposed between the splice portions 132, 136 and the first end 112 of the tray 110. By disposing the rework channel 124 between the two main channels 120, 124, reworked splices from both of the main channels 120, 122 can be routed into the common rework channel 124.

In certain implementations, the trunk retention arrangement is configured to retain multiple trunk cables T1, T2 at the splice module 100. Each trunk cable T1, T2 can be routed into a respective one of the main channels 120, 122. In certain implementations, the sheath M of each trunk cable T1, T2 can be separately mounted to the retention insert 150 to secure the trunk cable T1, T2 to the splice module 100. For example, the retention insert 150 may define multiple first ends at which the trunk cables T1, T2 can be secured. In the example shown, the retention insert 150 includes two first ends 151, 153 that each receive the sheath M of one of the two trunk cables T1, T2. Each first end 151, 153 has a respective set of teeth 156 (see FIG. 4) that align with a respective set of holes 158 in the tray 110.

In certain examples, the retention insert 150 includes a two-piece housing 152, 154 that defines a Y-shaped passageway through which the trunk cable fibers extend. For example, the trunk cable fibers $f_T$ of the first trunk cable T1 extend from one of the first ends 151 of the retention insert 150 to the common second end 155; the trunk cable fibers $f_T$ of the second trunk cable T2 extend from another of the first ends 153 of the retention insert 150 to the common second end 155. In certain examples, the common second end 155 spans both of the main channels 120, 122 and the rework channel 124. Accordingly, any of the trunk cable fibers $f_T$ can be routed selectively into the main channels 120, 122 or into the rework channel 124.

In certain implementations, the tray 110 includes a divider 157 that fits between the two first ends 151, 153 of the retention insert 150. The divider 157 inhibits movement of the retention insert 150 through the first end 112 of the tray 110. The second end 155 of the retention insert 150 abuts dividers between the main channels 120, 122 and the rework channel 124. These dividers inhibit movement of the retention insert 150 through the second end 114 of the tray 110. The pocket 115 is defined between the channel dividers and the first end 112 of the tray 110. The divider 157 may be disposed within the pocket 115. In the example shown, the retention insert 150 is axially captured within the pocket 115 by the divider 157 and the channel dividers. The second lid 180 inhibits removal of the retention insert 150 from the pocket 115 through an open top of the tray 110.

A first set of optical splices S1 between trunk cable fibers (or groups of trunk cable fibers) of a first trunk cable T1 and respective connectorized pigtails P1 are disposed in the splice portion 132 of a first of the main channels 120. A second set of optical splices S2 between trunk cable fibers (or groups of trunk cable fibers) of a second trunk cable T2 and respective connectorized pigtails P2 are disposed in the splice portion 136 of a second of the main channels 124.

Both sets of optical splices S1, S2 can be tested, redone as needed, and then enclosed within the first splice portions 132, 136 using the first lid 170. For example, the first splice portions 132, 136 are sufficiently long to accommodate a new splice location of a re-spliced trunk fiber and pigtail, the new splice location being offset from an initial splice location of the same trunk fiber and pigtail. In certain examples, the first splice portion 132, 136 can be sufficiently long to accommodate 3-5 re-splices. The first lid 170 may cover the splice portions 132, 136 of both the first and second main channels 120, 122. The first lid 170 also may include two sets of injection and/or ventilation holes 176—one set for each of the splice portions 132, 136 of the main channels 120, 122.

After mounting the first lid 170, the optical splices S1, S2 are tested again. If additional rework is needed, the appropriate trunk cable fibers $f_T$ are severed at the access portion 134, 138 of the appropriate main channel 120, 122. The severed fibers from both main channels 120, 122 are re-spliced to new pigtails $P_N$ previously routed into the rework channel 124. The new optical splices $S_N$ are disposed within the splice portion 140 of the rework channel 124. The new optical splices $S_N$ are enclosed by mounting the second lid 180 to the tray 110. In certain implementations, the second lid 180 covers the access portions 136, 138 of both of the main channels 120, 122. In certain examples, the second lid 180 also covers the splice portion 140 of the rework channel 124. The second lid 180 defines injection and/or ventilation holes 186 in alignment with the splice portion 140 of the rework channel 124.

In some implementations, this splicing process is implemented within a factory. For example, this splicing process may be utilized to terminate a trunk cable quickly and easily using connectorized pigtails. The rework channel 124 of the splice module 100 allows a technician to fix one or more of the optical splices S damaged during encapsulation, thereby reducing the need to start over with a new trunk cable when damage occurs. The splice module 100 can then be mounted to a blade, tray, or other piece of equipment and the connectorized pigtails can be routed to interior ports carried by the equipment. Accordingly, the piece of equipment may be pre-terminated at the factory using one or more of the splice modules 100. In other implementations, this splicing process could be implemented in the field.

Figure 9:
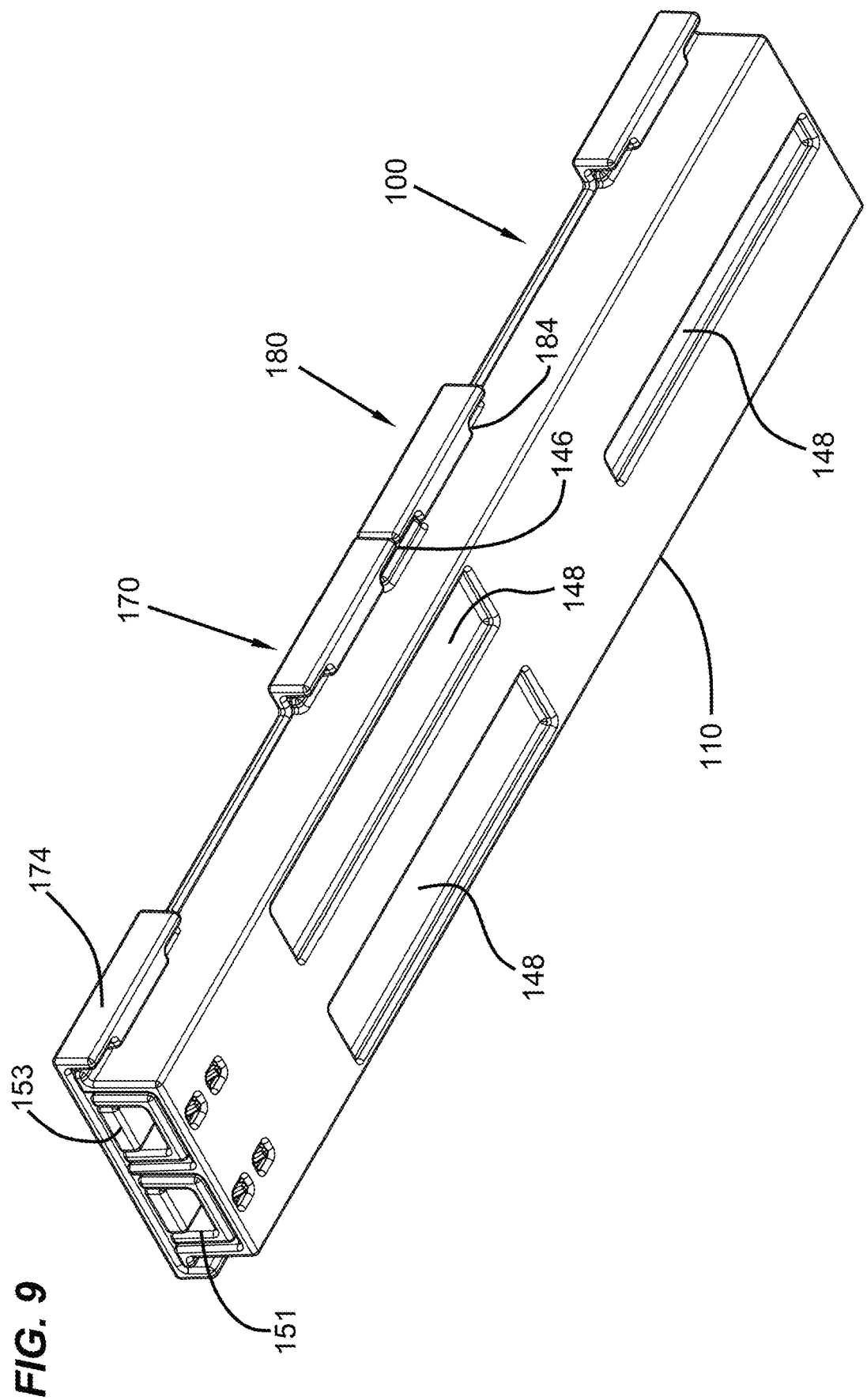
FIG. 9 is a bottom perspective view of the assembled splice module of FIG. 1.
Figure 10:
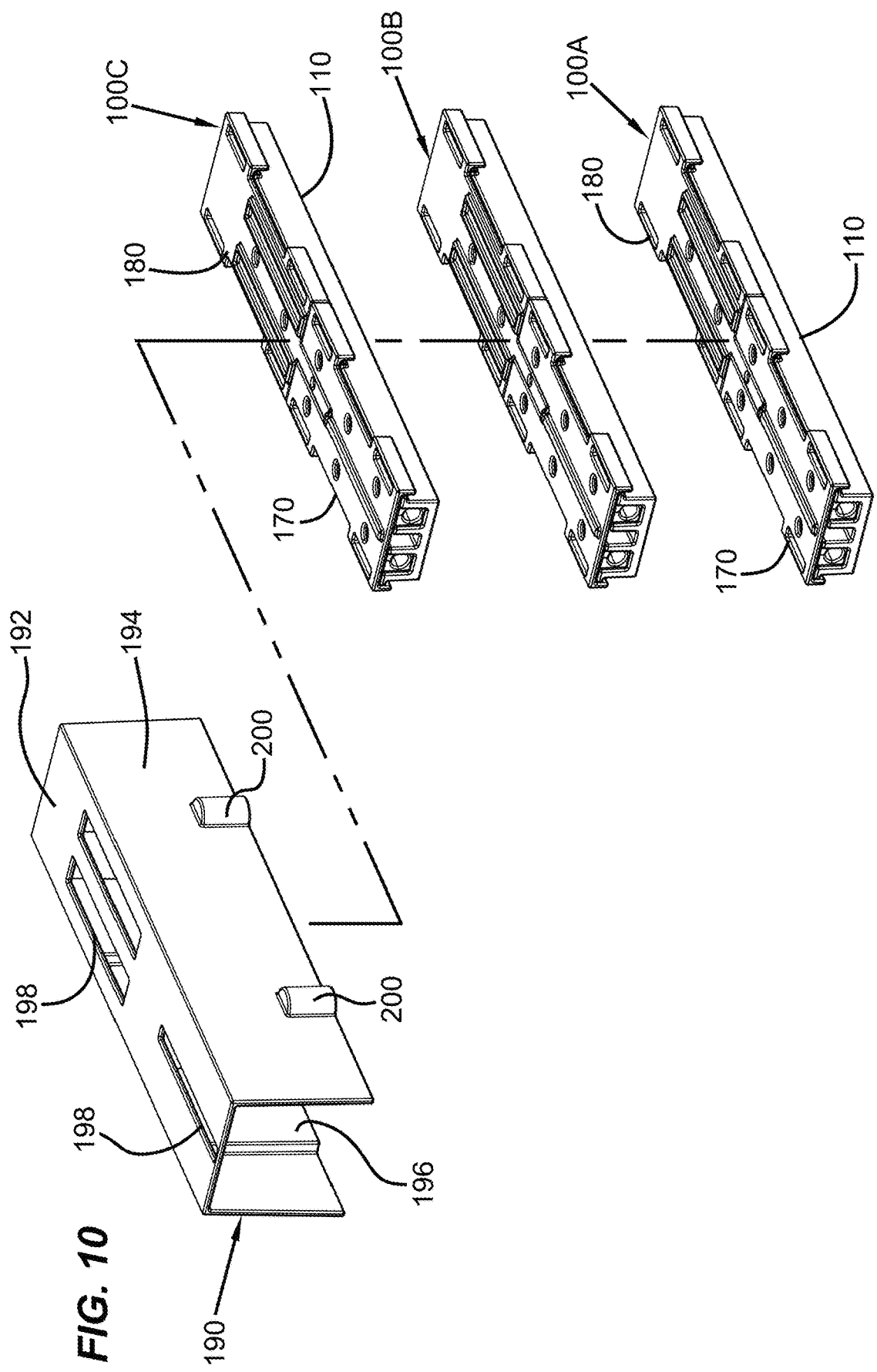
FIG. 10 is an exploded view of an example splice assembly including a locking cover mounted over a stack of one or more of the splice modules of FIG. 1.
Figure 11:
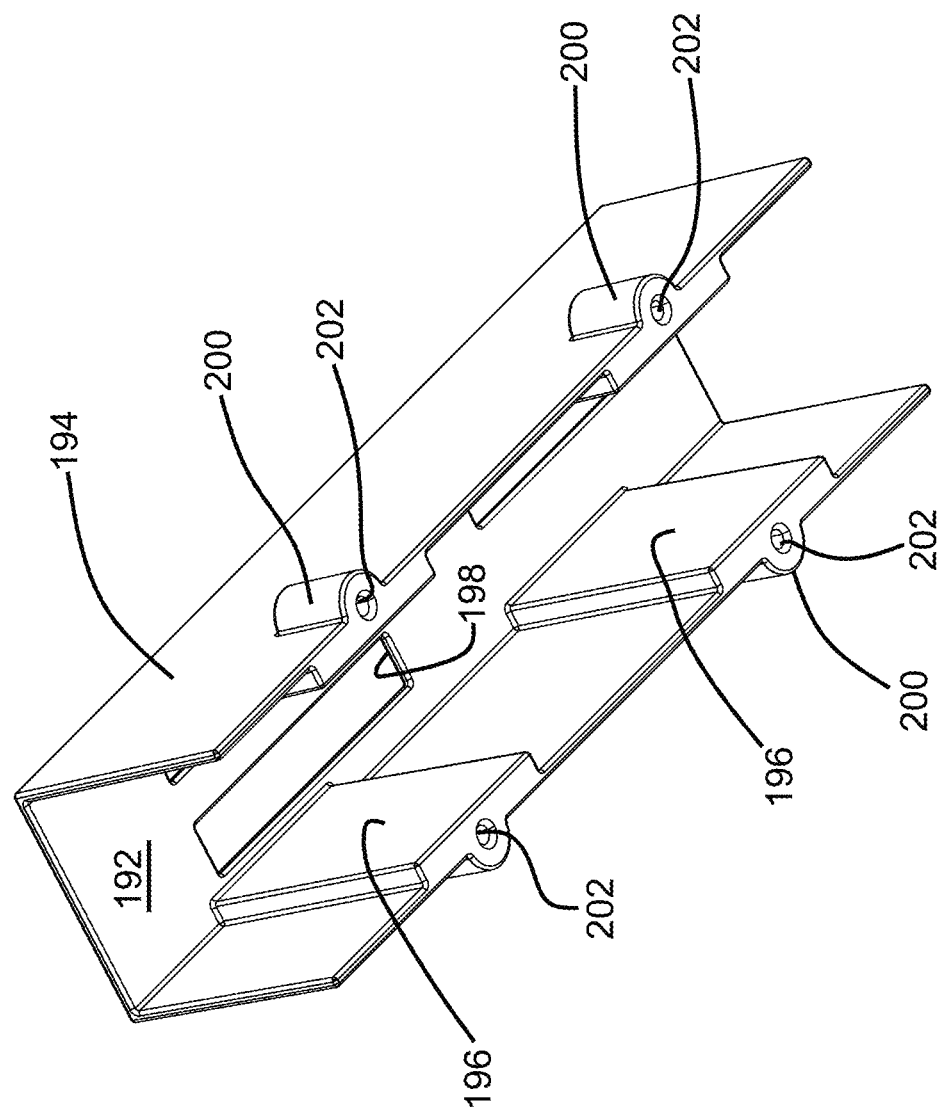
FIG. 11 is a bottom perspective view of the locking cover of FIG. 10.
Figure 12:
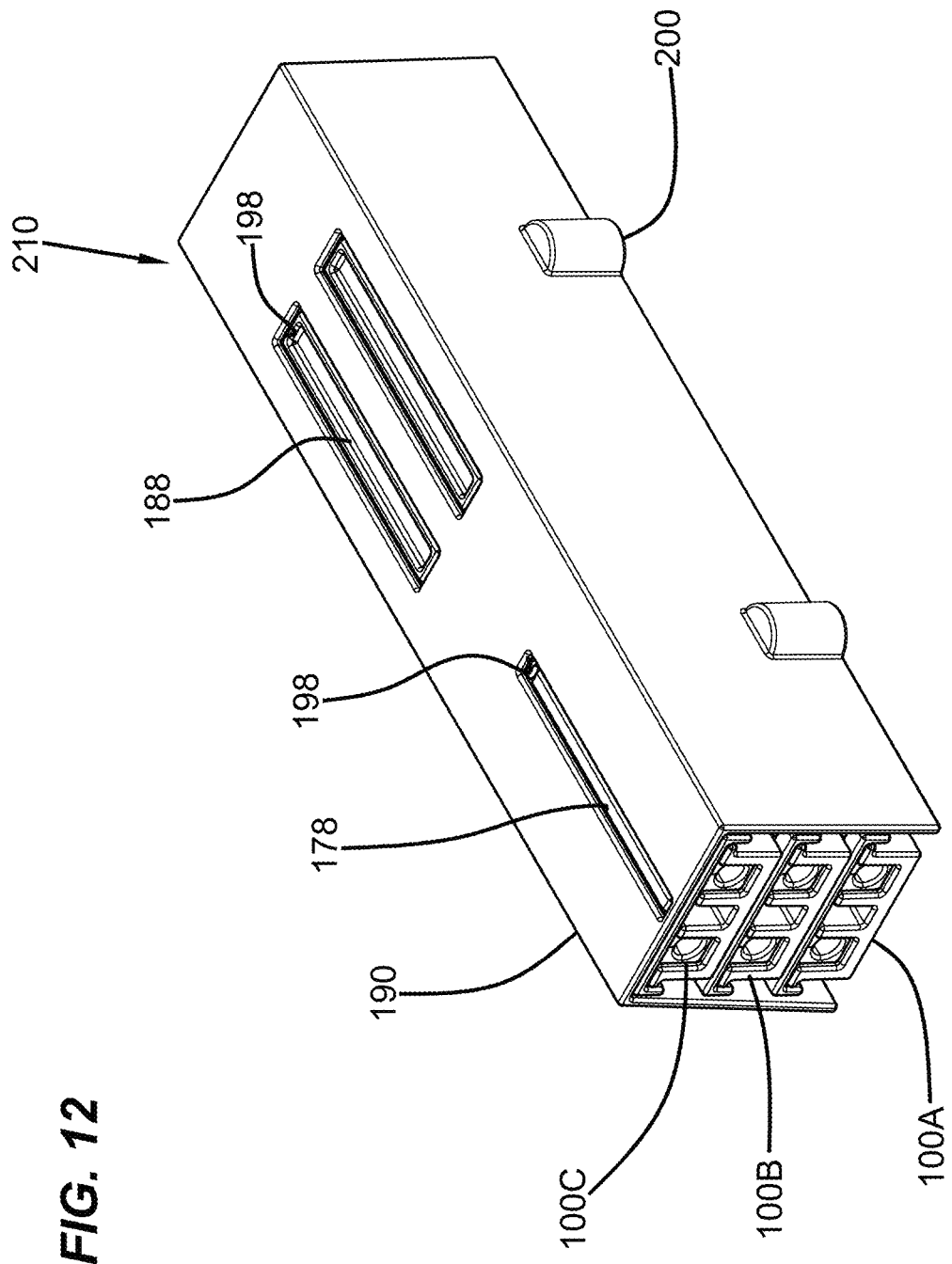
FIG. 12 is a top perspective view of the splice assembly of FIG. 10
Figure 13:
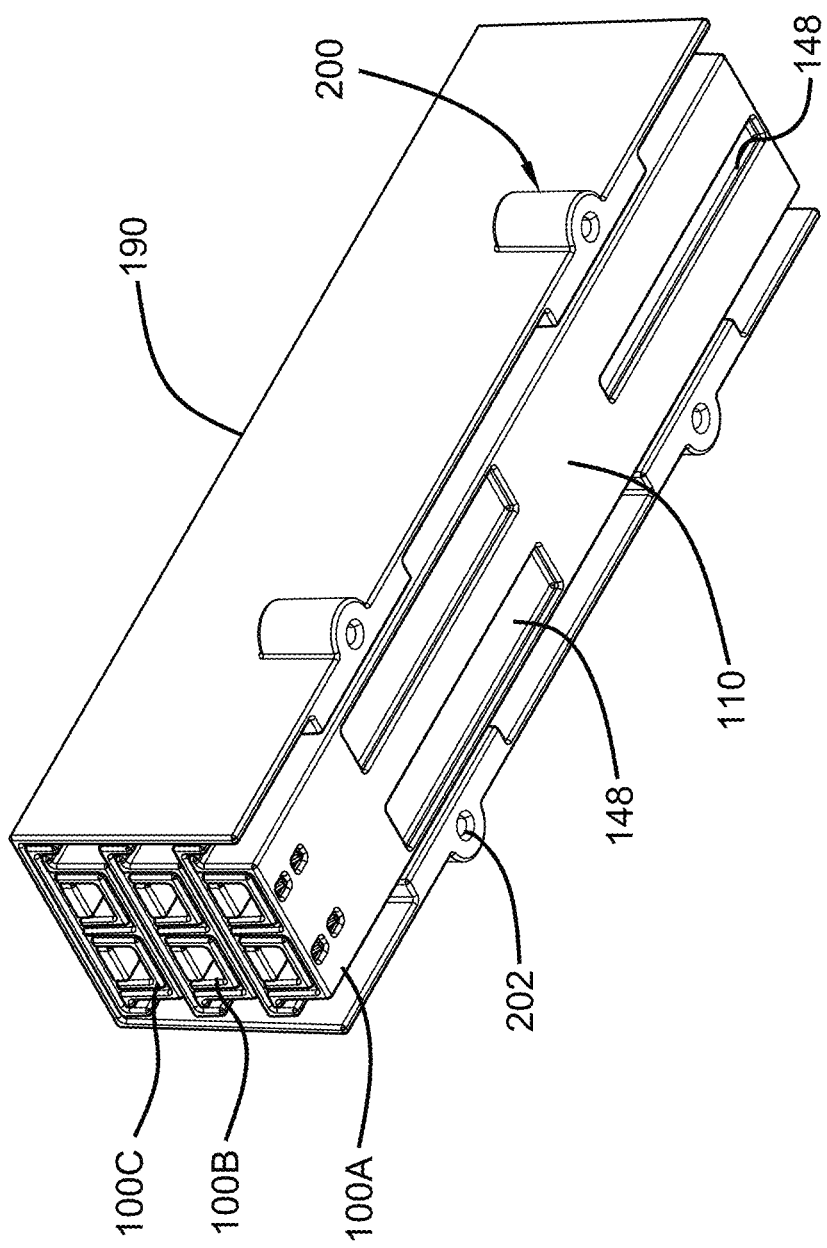
FIG. 13 is a bottom perspective view of the assembled splice assembly of FIG. 12.
Figure 14:
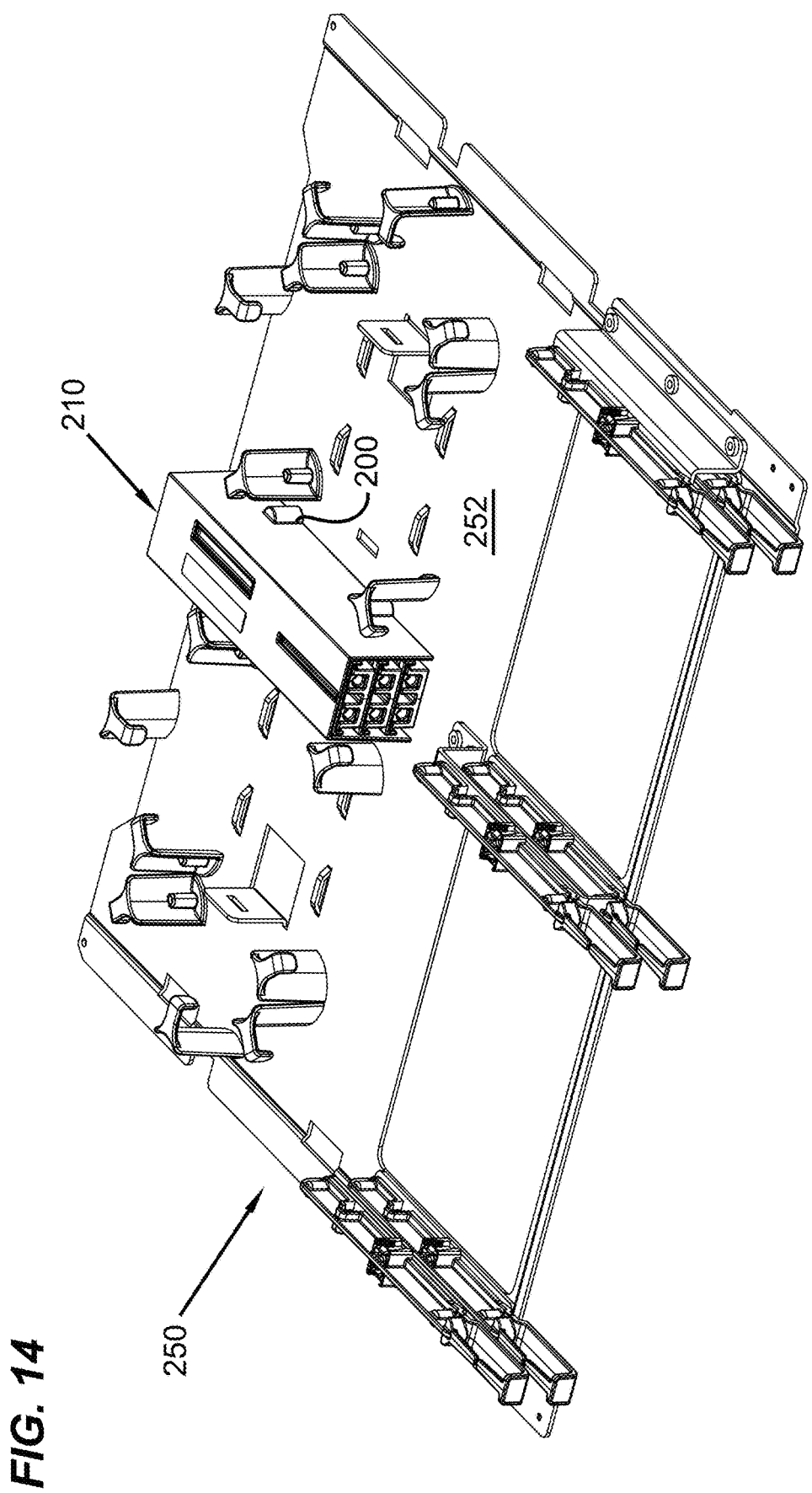
FIG. 14 is a top perspective view of the splice assembly of FIG. 12 mounted to an example blade or tray.

As shown in FIGS. 2 and 9, the tray 110 and lids 170, 180 of the splice module 100 are configured to facilitate stacking of multiple splice modules 100. In certain implementations, the tray 110 and lids 170, 180 include an alignment arrangement so that the lids 170, 180 of a first splice module 100A fit with the tray 110 of a second splice module 100B stacked over the first splice module 100A (e.g, see FIGS. 13 and 14). In certain implementations, the alignment arrangement inhibits axial movement (i.e., along the length L of the tray 110) between the first and second splice modules 100A, 100B. In certain implementations, the alignment arrangement inhibits lateral movement (i.e., along the width W of the tray 110) between the first and second splice modules 100A, 100B.

In certain implementations, the lids 170, 180 include rails 178, 188 or other protrusions that fit into recesses 148 defined by the tray 110 at a bottom of the tray 110 (e.g., see FIG. 9). In certain examples, the rails 178 of the first lid 170 are a different size than the rails 188 of the second lid 180. Accordingly, such splice modules 100A, 100B cannot be flipped 180 degrees relative to each other when stacked. In the example shown, the rail 178 of the first lid 170 is narrower than the rails 188 of the second lid 180. Accordingly, the recess 148 in the tray 110 that aligns with the first lid rail 178 is narrower than the recesses 148 in the tray 110 that align with the second lid rails 188.

FIGS. 10-14 illustrate one or more splice modules 100 disposed within a locking cover 190 to form a splice assembly 210. In certain implementations, the splice assembly 210 includes a stack of identical splice modules 100. In the example shown, the splice assembly 210 includes three splice modules 100A, 100B, 100C. In other examples, however, the splice assembly 210 may include a greater or lesser number of splice modules 100 (e.g., one, two, four, five, six, eight, ten, twelve, etc.).

The locking cover 190 mounts over the splice modules 100, 100A, 100B, 100C. The locking cover 190 includes a top 192 that extends over the stack of one or more splice modules 100, 100A, 100B, 100C. The locking cover 190 also includes sidewalls 194 extend downwardly from the top 192. The sidewalls 194 inhibit lateral movement of the splice modules 100, 100A, 100B, 100C (e.g., movement along the width W of the tray 110) relative to the locking cover 190. Opposite ends of the locking cover 190 are open to accommodate the trunk cables T, T1, T2 at the first end and the connectorized pigtails P, P1, P2 at the second end.

In certain implementations, the locking cover 190 is configured to engage the splice module 100, 100A, 100B, 100C to inhibit axial movement of the splice module 100, 100A, 100B, 100C (e.g., along the length L of the tray 110) relative to the locking cover 190. For example, the locking cover 190 may include interior protrusions 196 that engage with inward portions of the splice modules 100, 100A, 100B, 100C to inhibit axial movement of the splice modules 100, 100A, 100B, 100C. In certain examples, the inward protrusions 196 engage between the guide channels 174, 184 of the lids 170, 180. For example, the guide channels 174, 184 of the lids 170, 180 of a stack of splice modules 100, 100A, 100B, 100C may align with each other to form vertical columns along which the inward protrusions 196 may slide when the locking cover 190 is mounted over the stack.

In certain implementations, the locking cover 190 includes a retention arrangement by which the locking cover 190 secures to a surface. For example, an example splice assembly 210 is shown mounted to a surface 252 of a blade or tray 250 in FIG. 14. In the example shown, the retention arrangement includes a plurality of anchor members 200 defining fastener openings 202. The anchor members 200 are coupled to or integral with the sidewalls 194 of the locking cover 190. In certain example, screws or other fasteners may extend through the fastener openings 202 and through the surface 252 to secure the locking cover 190 to the surface 252. The locking cover 190 holds the one or more splice modules 100, 100A, 100B, 100C at the surface 252.

In the example shown, the splice assembly 210 is disposed at a center of the surface 252. Accordingly, the pigtails P, P1 extending from the first main channel 120 can be routed to a first side of the blade or tray 250 while the pigtails P, P2 extending from the second main channel 122 can be routed to a second side of the blade or tray 250. In other examples, multiple splice enclosures 100 each having only one main channel can be disposed on the surface 252.

In certain examples, the retention arrangement is configured to inhibit releasing the locking cover 190 from the surface 252. Accordingly, the retention arrangement can be configured to inhibit removal of the splice assembly 210 from the blade or tray 250. In the example shown, the fastener openings 202 defined by the anchor members 200 are accessible only from a bottom of the locking cover 190 (e.g., from the side of the locking cover facing the surface 252). Accordingly, the fasteners holding the splice assembly 210 to the blade or tray 250 are not readily accessed.

Example blades or trays suitable for use with the splice assembly 210 or any of the splice modules 100 disclosed herein are shown and described in U.S. Appl. No. 62/884,897, filed Aug. 9, 2019, titled "Equipment Panel with Termination Region," [02316.7678USP2] the disclosure of which is hereby incorporated herein by reference in its entirety. Other examples of suitable blades or trays can be found in U.S. application Ser. No. 15/748,019, filed Jan. 26, 2018, and titled "Bladed Chassis Systems," [02316.4434USWO] and U.S. Appl. No. 62/868,468, filed Jun. 28, 2019, and titled "Bladed Panel System and Components Therefore," [02316.7804USP1] the disclosures of which are hereby incorporated herein by reference in their entireties.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A splice module comprising:
a tray extending along a length between opposite first and second ends, the tray defining a first channel and a second channel that are each accessible at the first and second ends of the tray, each of the first and second channels defining a respective splice portion, the splice portion of each of the channels being bounded at opposite ends by seals, each seal including a gasket body that fits within a respective slot defined by the respective one of the first and second channels, the first channel also defining an access portion located between the splice portion and the second end of the tray;
a first lid that mounts to the tray to cover the splice portion of the first channel; and
a second lid that mounts to the tray to cover the splice portion of the second channel and the access portion of the first channel;
wherein the tray also defines a third channel accessible at the first and second ends of the tray, wherein the second channel is disposed between the first and third channels, the third channel also defining a respective splice portion and a respective access portion, wherein the first lid covers the splice portion of the third channel when the first lid is mounted to the tray, and wherein the second lid covers the access portion of the third channel.

2. The splice module of claim 1, wherein the gasket body of each seal has a slit extending radially between an interior of the gasket body and an exterior of the gasket body, the slit facing away from the tray to enable lateral mounting of the gasket body over a group of fibers.

3. A splice module comprising:
a tray extending along a length between opposite first and second ends, the tray defining a first channel and a second channel that are each accessible at the first and second ends of the tray, each of the first and second channels defining a respective splice portion, the first channel also defining an access portion located between the splice portion and the second end of the tray, the tray also defining a third channel accessible at the first and second ends of the tray, the second channel being disposed between the first and third channels, the third channel also defining a respective splice portion and a respective access portion;
a first lid that mounts to the tray to cover the splice portion of the first channel, the first lid covering the splice portion of the third channel when the first lid is mounted to the tray; and
a second lid that mounts to the tray to cover the splice portion of the second channel and the access portion of the first channel, and the second lid covering the access portion of the third channel.

4. The splice module of claim 3, wherein the first lid defines at least one injection hole and the second lid defines at least one injection hole.

5. The splice module of claim 3, wherein the splice portion of the second channel is located closer to the second end of the tray than the splice portion of the first channel.

6. The splice module of claim 3, wherein the second lid includes an extension that fits within a slot defined by the first lid.

7. The splice module of claim 3, further comprising a trunk retention arrangement at the first end of the tray.

8. The splice module of claim 7, wherein the trunk retention arrangement includes a plurality of teeth and a plurality of holes.

9. The splice module of claim 8, wherein the teeth are disposed on a retention insert and the holes are disposed on the tray.

10. The splice module of claim 9, wherein the retention insert includes a two-piece housing that cooperates to define a Y-shaped channel.

11. The splice module of claim 3, wherein the tray, the first lid, and the second lid form a first sub-unit that is one of a plurality of identical sub-units; wherein a second of the sub-units is stacked over the first sub-unit.

12. The splice module of claim 11, further comprising a locking cover that mounts over at least the first sub-unit, the cover being configured to engage the first sub-unit to inhibit movement of the first sub-unit along the length of the first sub-unit relative to the locking cover.

13. The splice module of claim 12, wherein the locking cover includes a retention arrangement by which the locking cover secures to a surface, the locking cover defining an interior region in which at least the first sub-unit is disposed when the locking cover is secured to the surface.

14. The splice module of claim 13, wherein the plurality of the sub-units are disposed within the interior region of the locking cover when the locking cover is secured to the surface, each of the sub-units being retained by the locking cover against length-wise movement.

15. The splice module of claim 13, wherein the retention arrangement is not releasable.

16. A splice enclosure comprising:
a tray extending along a length between opposite first and second ends, the tray defining two outer channels and an inner channel disposed between the two outer channels, each of the outer and inner channels being accessible at the first and second ends of the tray, each of the outer and inner channels defining a respective splice portion, the two outer channels also defining an access portion located between the respective splice portion and the second end of the tray;
a first lid that mounts to the tray to cover the splice portions of the two outer channels; and
a second lid that mounts to the tray to cover the splice portion of the inner channel and the access portions of the two outer channels.

* * * * *